United States Patent
Arai et al.

[11] 3,714,458
[45] Jan. 30, 1973

[54] METHOD FOR SUPPLYING ROTATIONAL SPEED SIGNALS
[75] Inventors: Hiroshi Arai; Takakazu Mori, both of Toyoto, Japan
[73] Assignee: Toyota Jidosha Kogyo Kabushiki Kaisha, Toyota-shi, Japan
[22] Filed: March 24, 1971
[21] Appl. No.: 127,650

[30] Foreign Application Priority Data
April 2, 1970  Japan.................................45/29127

[52] U.S. Cl. ........................307/120, 324/174, 317/5
[51] Int. Cl. ..................................................H01h 35/00
[58] Field of Search.............324/173, 174, 171, 163; 307/106, 120, 116, 152; 317/5

[56] References Cited
UNITED STATES PATENTS
3,358,230   12/1967   Wiley.................................324/171

Primary Examiner—Herman J. Hohauser
Attorney—Cushman, Darby & Cushman

[57] ABSTRACT

A method by which even if a plurality of devices requiring information in terms of the rotational speed of an engine or a wheel are installed in the same automobile, only one rotational speed detector for each phenomenon is employed to operate a plurality of devices requiring information in terms of the engine or wheel revolutions.

4 Claims, 4 Drawing Figures

INVENTOR:
Hiroshi ARAI
Takakazu MORI
BY
Cushman, Darby & Cushman
ATTORNEYS 3,714,458

METHOD FOR SUPPLYING ROTATIONAL SPEED SIGNALS

BACKGROUND OF THE INVENTION

1. Field of the Invention

The present invention relates to a method for supplying rotational speed signals.

2. Description of the Prior Art

Automotive vehicles have employed electrical devices which are designed to obtain information in terms of the rotational speed of the engine or the wheel, either to directly indicate such a rotational speed itself, or to take part in the control of the essential functions of the vehicles on the basis of such information. The former include, for example, a tachometer for indicating the rotative speed of an engine, a speedmeter for converting the rotational speed of a wheel into a circumferential speed to indicate the vehicle's speed and an odometer for integrating the number of revolutions of a wheel to indicate the distance traveled, while the latter includes, for example, an automatic speed control system for providing a constant cruising speed control according to the vehicle's speed, an electrical automatic transmission system which employs vehicle speed signals to determine the shift points of a hydraulic automatic transmission, and an anti-skid device for preventing locking of the wheels when the brakes are applied. Each of these devices requires a separately provided rotational speed detector, so that when two or more of these devices are required in combination on the same vehicle, the use of such devices will be very uneconomical and undesirable since they need their own separate rotational speed detectors.

SUMMARY OF THE INVENTION

The object of the present invention is to provide a method wherein, even if a plurality of electrical devices requiring information of the rotational speed of an engine or a wheel are installed in the same vehicle, only one rotational speed detector for each phenomenon suffices to operate a plurality of electrical devices requiring information of such a rotational speed.

Another object of the present invention is to enable each of the electrical devices to separately receive proper information of the rotational speed without incurring mutual influence from other electrical devices.

DESCRIPTION OF THE PREFERRED EMBODIMENTS

Figure 1:
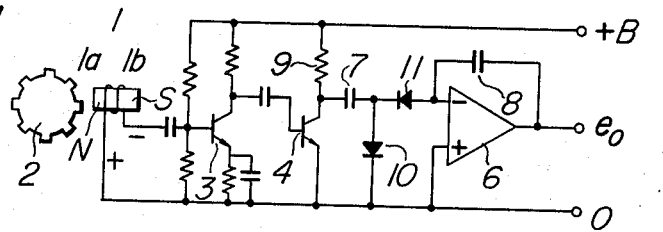
FIGS. 1 and 2 illustrate some examples of the rotational speed detectors known in the art.

Referring now to FIG. 1 illustrating an example of the prior art rotational speed detectors, numeral 1 designates a pulse transducer comprising a permanent magnet 1a having a coil 1b wound thereon and mounted on a shaft operatively associated with a rotating member whose rotational speed is to be detected, and the pulse transducer 1 is disposed opposite to a rotor 2 consisting of a toothed magnetic material which rotates at the same rpm or at a speed having a predetermined relation with the rotational speed of the rotating member, so that as the rotor 2 rotates, an AC current is generated by variations of the magnetic flux interlinking the coil 1b. The alternating current generated by the pulse transducer 1 is applied to the base of a transistor 3 for amplification and the amplified alternating current is then applied to the base of a transistor 4. When the alternating current applied to the transistor 4 is negative, that is, when it has a polarity shown in FIG. 1 the transistor 4 is rendered conductive, while the transistor 4 is rendered non-conductive when the alternating current applied thereto is positive. Thus, for each cycle of the pulse transducer 1 a positive potential and a zero potential alternately appear at the collector of the transistor 4. Numeral 6 designates an operational amplifier whose output terminal is fed back to its inverting input terminal by way of a capacitor 8 to constitute an integrator. A capacitor 7 is charged (i.e., with a charging voltage $e_i$) by way of a resistor 9 and a diode 10 when the transistor 4 is non-conductive, and when the transistor 4 is conducting this charging voltage is applied by way of a diode 11 to the input terminal of the operational amplifier 6 to produce an output voltage at its output terminal. The voltage $e_o$ at the output terminal is given as $$e_o \approx (C_2/C_1) e_i \cdot n$$

where $C_1$ is the capacitance of the capacitor 7, $C_2$ is the capacitance of the capacitor 8, and $n$ is the number of times that the transistor 4 is rendered conductive. By suitably selecting the charging and discharging time constants of the capacitor 7, variations in the number of the teeth of the rotor 2 per unit time, i.e., its rotational speed can be detected in terms of an analog quantity.

Figure 2:
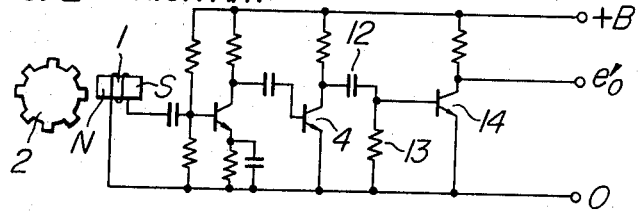

FIG. 2 illustrates another example of the prior art rotational speed detectors in which a transistor 4 and the preceding component parts are identical in operation with the corresponding component parts illustrated in FIG. 1. A capacitor 12 and a resistor 13 constitute a differentiation circuit which conducts a transistor 14 by attaining the conduction level between the base and the emitter of the transistor 14 with the output obtainable when the collector voltage of the transistor 4 changes from a zero potential to a positive potential. In other words, each time the tooth of the rotor 2 passes through the pulse transducer 1, a pulse voltage appears at an output terminal $e'_o$ of the transistor 14, so that the number of rotations of the rotor 2 can be detected in terms of a digital quantity. It is self-evident that by calculating the number of such pulses in terms of a quantity per unit time, the device of the second example operates as a rotational speed detector.

While the examples of the conventional rotative speed detectors have been described in which the rotational speed of a rotating member is detected in terms of an analog or digital quantity by means of a pulse transducer, there are many other prior art rotational speed detectors such as one which detects the speed of an engine by virtue of variations in the voltage due to the closing and opening of the contact points of an engine's distributor.

Figure 3:
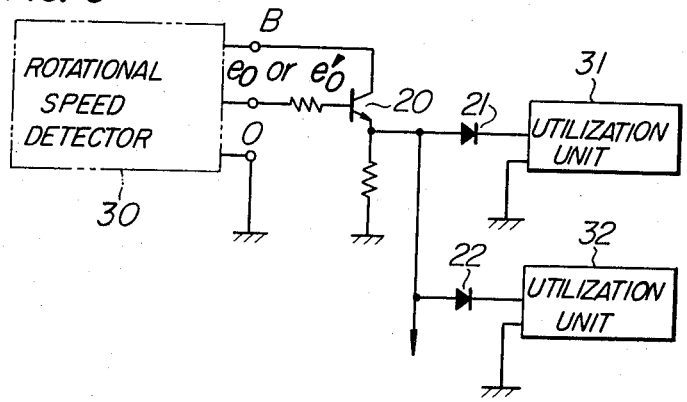
FIGS. 3 and 4 illustrate preferred embodiments of the present invention.

Referring now to FIG. 3, numerals 31 and 32 designate electrical devices shown in the form of blocks which require information in terms of the rotational speed of an engine or a wheel. Numeral 20 designates a transistor whose base is connected to the output terminal of a rotational speed detector 30 and the transistor 20 is connected to constitute an emitter follower to reduce the output impedance. Numerals 21 and 22 designate diodes which apply the analog or digital voltage, which is developed at the emitter of the transistor 20 and corresponds to the rotational speed, to the input terminals of the electrical devices 31 and 32, and which also serve to prevent the electrical devices 31 and 32 from interferring with each other by way of their input terminals. With this arrangement, it is no longer necessary to provide a separate rotational speed detector for each of the electrical devices. Instead, only one rotational speed detector is employed and an impedance transformer such as an emitter follower is connected to the output terminal of this detector, so that its output may be supplied as the required rotational speed information to the respective electrical devices by way of diodes provided to prevent mutual interference between the respective electrical devices.

Figure 4:
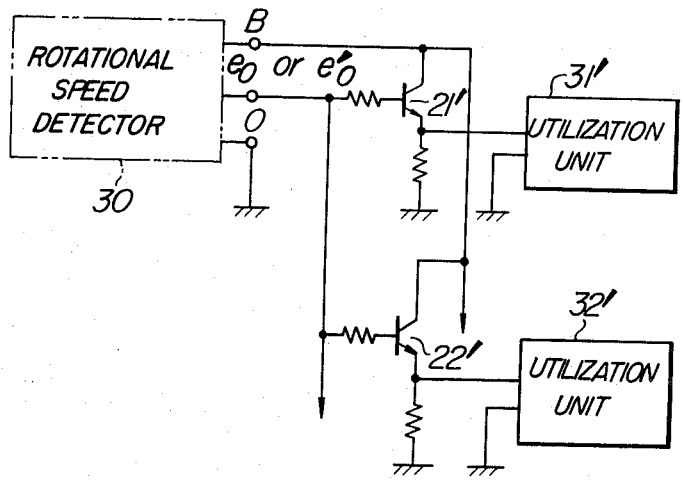

Referring now to FIG. 4 illustrating another embodiment of the present invention, numerals 31' and 32' designate electrical devices drawn in the form of blocks and requiring information in terms of the rotational speed of an engine or a wheel similarly with the electrical devices 31 and 32 shown in FIG. 3; 21' and 22' transistors whose bases are connected to the output terminal of a rotational speed detector 30 to constitute emitter followers to reduce the output impedance. The output terminals of the impedance transforming transistors 21' and 22' are connected to the input terminals of the electrical devices 31' and 32'. This arrangement also makes it unnecessary to provide a separate rotational speed detector for each of the electrical devices, and the necessary rotational speed information can be supplied to the respective electrical devices by means of a single rotational speed detector.

Moreover, the embodiment of FIG. 4 is advantageous in that even if the voltage produced at the output terminal of the rotational speed detector 30 is an analog quantity and the electrical devices 31' and 32' need voltages of different values for a given rotational speed, the values of the biasing resistors or the load resistors may be set to any given values to meet the aforesaid requirement.

We claim:

1. A method for supplying electrical rotational speed signals to a plurality of electrical devices responsive thereto, comprising:

impedance transforming the electrical rotational speed signals to reduce the output impedance thereof, and coupling said transformed signals to at least one of said electrical devices in such a manner that said electrical devices are electrically separated from one another, whereby rotational speed signals are supplied independently to each of said plurality of electrical devices.

2. A supply circuit including rotational speed detector means adapted to provide electrical rotational speed signals and output devices responsive thereto comprising:

impedance transformer means having a reduced output impedance responsively coupled to said speed detector means for transforming the electrical speed signals through said reduced output impedance of said transforming means; and at least one of the output devices coupled to said impedance transformer means responsive to said transformed electrical signal, said output device electrically separated from any of the other electrical devices by means of said impedance transformer means.

3. The supply circuit of claim 2, wherein said impedance transformer is a diode.

4. The supply circuit of claim 2, wherein said impedance transformer is a transistor.

* * * * *